No. 788,154. PATENTED APR. 25, 1905.
J. A. & H. W. HOCK.
MANDREL.
APPLICATION FILED SEPT. 22, 1903.
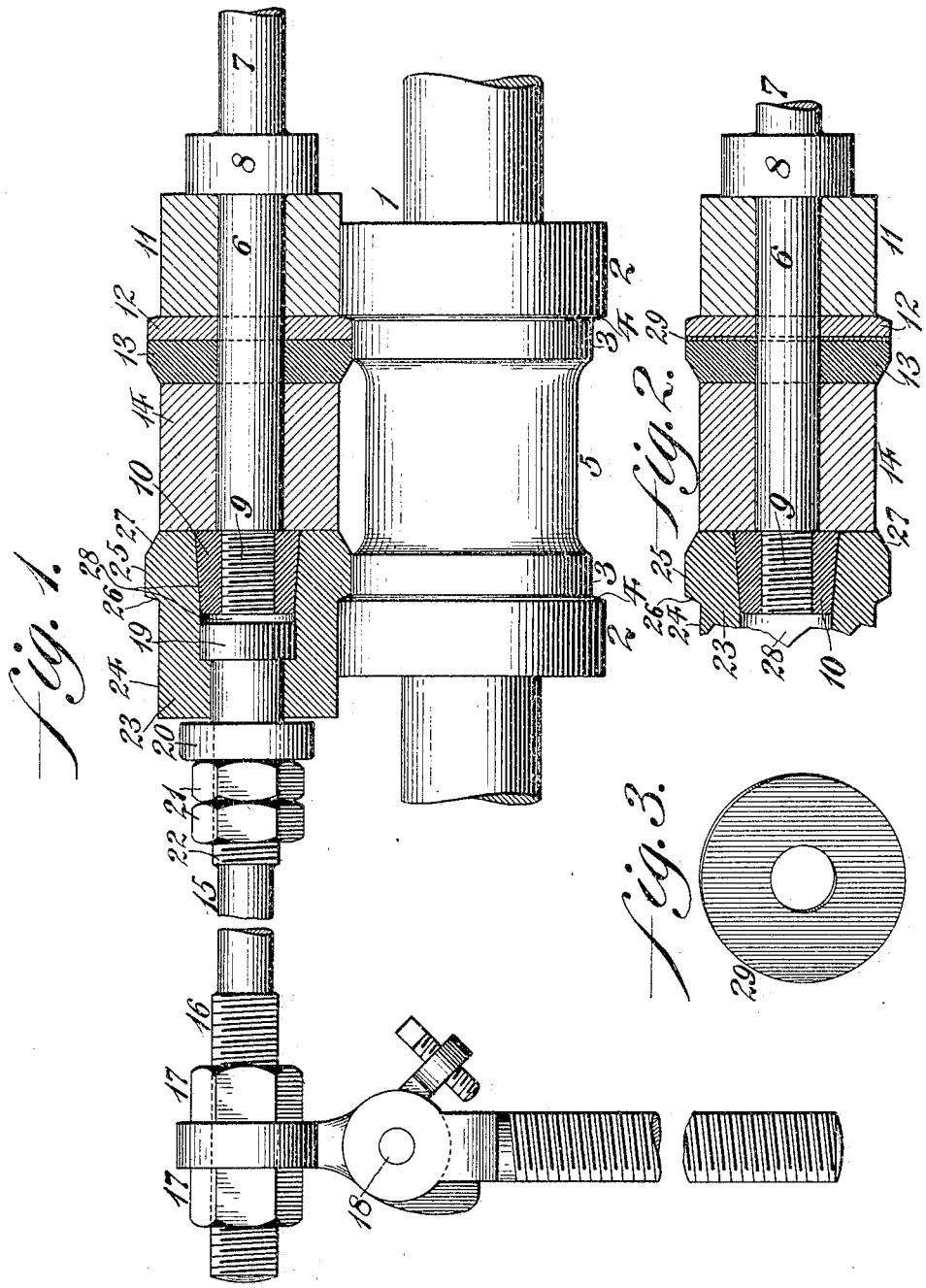

No. 788,154.                                   Patented April 25, 1905.

UNITED STATES PATENT OFFICE.

JOHN A. HOCK AND HENRY W. HOCK, OF YOUNGSTOWN, OHIO.

MANDREL.

SPECIFICATION forming part of Letters Patent No. 788,154, dated April 25, 1905.

Application filed September 22, 1903. Serial No. 174,207.

*To all whom it may concern:*

Be it known that we, JOHN A. HOCK and HENRY W. HOCK, citizens of the United States, residing at Youngstown, in the county of Mahoning and State of Ohio, have invented a new and useful Improvement in Mandrels, of which the following is a specification.

Our invention relates to apparatus for shaping and welding pipe couplings, sockets, and the like, provided with countersunk recesses at their ends.

In our Patent No. 748,948, granted January 5, 1904, is described apparatus for welding recessed pipe couplings or sockets, the essential features of which are a cluster of welding-rolls, together with a mandrel, the latter comprising a central working portion corresponding in diameter and shape to the interior of the coupling to be formed and portions of enlarged diameter at both sides of said working portion, which project into the pass of the rolls and form the recesses in the ends of the coupling. Preferably the working faces of the enlarged portions are beveled and the mandrel is made in two transversely-separable sections to enable the welded coupling to be removed therefrom. The sections are held in place in the rolls by means of coöperating annular shoulders on the mandrel-sections and rolls. In the use of this apparatus it was found that the mandrel wears quite rapidly, and especially on the beveled faces of the enlarged end portions thereof.

The present invention has for its object to provide a mandrel having means for compensating for the wear and preventing slackness or movement in the parts.

In the accompanying drawings, Figure 1 is a view, partly in elevation and partly in section, of our improved mandrel with one of the coöperating welding-rolls. Fig. 2 is a sectional view of the mandrel after use and correction, and Fig. 3 shows one of the washers or disks for taking up wear.

Our improved mandrel may be used with any form of welding apparatus, such as hammer-dies, but preferably will be used in conjunction with a cluster of welding-rolls, such as are well known in the art. In use the cluster generally consists of five rolls, although either four or more than five may be employed, and the mandrel is located centrally within the cluster.

In the drawings only one of the welding-rolls has been shown, this being designated by the numeral 1 and being provided with the flanges 2, which are reduced to provide bearing-surfaces 3 for the enlarged portions of the mandrel and also to provide annular shoulders 4 for engaging similar shoulders on the mandrel-sections to prevent endwise movement of the latter. The central portion of the rolls is provided with the working face 5. These rolls will be mounted and driven in any approved manner.

The essential element of our apparatus consists of the mandrel, which preferably is made in two transversely-separable sections in order to enable the welded coupling to be removed therefrom. These sections when united form a mandrel having a central working portion 14, corresponding in size and contour to the diameter and internal shape of the coupling to be made. At each side of this working face are enlarged portions 13 and 25, respectively, which during the operation of the apparatus coöperate with the bearing-faces 3 of the roll-flanges and project inwardly beyond said flanges into the pass of the rolls to form the countersunk recesses in the ends of the coupling. The inner faces of these enlarged portions preferably are beveled, as shown at 27. One of the mandrel-sections is provided with a socket 28 for receiving a teat or projection 10 on the other section in order to aline said sections. One of the sections is provided with a handle 7 for manipulating the same, and said mandrel-sections are provided with the annular shoulders 12 and 26, respectively, for contacting with the annular shoulders 4 of the rolls, so as to prevent endwise movement and separation of the mandrel-sections. These mandrels are subjected to considerable wear, and more especially on the bevel-faces 27 thereof, and the shoulders 12 and 26 also wear to a considerable extent. The present invention has for its object to provide means for compensating or taking up this wear. To this end the larger mandrel-section is made up of an arbor 6, which preferably is integral with and a continuation of the handle 7. On this arbor is a collar 8, and the end of the arbor is threaded, as at 9, for receiving a nut which also forms the plug or teat 10, above referred to. Preferably this plug and the recess 28 in which it fits are slightly tapered, as shown. The central working face of the mandrel 14 is formed as a sleeve surrounding the arbor 6, while the enlarged portion 13 is likewise formed as a sleeve, and the bearing-shoulder 12 is formed by another sleeve, and between the portion 12 and the collar 8 on the arbor is still another sleeve, 11. The sleeves 11, 12, 13, and 14 are held between the collar 8 and nut 10. The other mandrel-section 25 is also formed as a sleeve having a portion 23 of reduced diameter to provide a bearing-face 24, which contacts with the flange 2 of the rolls. The section is also provided with an enlarged bore for receiving the head 19 of the shaft 15. Outside of the sleeve and surrounding the shaft is a bearing-collar 20, which can be moved longitudinally of the shaft toward the sleeve by means of nuts 21, working on a threaded portion 22 of the shaft 15. The outer end of this shaft 15 is threaded, as at 16, and passes through a perforated bearing and is held in said bearing by means of nuts 27 on either side thereof. This bearing preferably is pivoted, as at 18, and the usual means will be provided for adjusting the same and holding it in fixed position.

In the use of the mandrel and rolls wear will occur mostly at the bevel-faces 27 and on the annular shoulders 12 and 26. When this occurs, the mandrel is taken out, the nut 10 removed, and the sleeve 14 or 13, or both, are faced off at their ends. Then a wear-compensating disk or washer 29 is placed between the sleeves 12 and 13 and the parts again assembled. The effect of this will be to move the sleeve 13 inwardly sufficiently far to compensate for the wear of the bevel-face thereof and also to move the sleeve 12 outwardly sufficiently far to compensate for the wear on the annular shoulder. The wear on the face 26 is compensated for by either moving the shaft 15 inwardly by adjusting the nuts 17 or by moving the collar 20 inwardly against the sleeve portion by means of the adjusting-nuts 21, or both. The adjusting-nuts 21 also serve to take up any wear that may occur between the head 19 and sleeve 23. Before this adjustment is made the inner end of the section 25 or the end of the sleeve 14, or both, will be faced off. In this manner all wear of the mandrel is compensated for. The mandrel, furthermore, being made of sections, can have any portion thereof renewed when worn out or broken without discarding the entire mandrel.

In case the mandrel is to be used for forming couplings which are recessed at one end only the enlarged portion 25 may be omitted, and in that case the sleeve 14 will be of sufficient length to project between and contact with the flanges 2 of the rolls.

What we claim is—

1. In apparatus for welding recessed pipe-couplings and the like, the combination of welding-rolls each provided with a working face and flanges or collars at the sides of said working face, and a mandrel coöperating with said rolls, said mandrel comprising a central portion corresponding in diameter and shape to the interior of the coupling, a portion of enlarged diameter at one side of said central portion and arranged to contact with the flanges of the rolls, said central and enlarged portions being in separate parts, means for securing said parts together, and means for advancing said enlarged portion toward said central portion to compensate for wear.

2. A mandrel for use in welding recessed pipe-couplings and the like, comprising a central sleeve corresponding in diameter and shape to the interior of the coupling, a sleeve of enlarged diameter at one side of said central sleeve, an arbor on which said sleeves are mounted, a shoulder on said arbor, and a wear-compensating disk between said shoulder and the enlarged sleeve whereby the latter may be advanced toward the central sleeve to compensate for wear.

3. A mandrel for use in welding recessed pipe-couplings and the like, comprising an arbor, separate sleeves thereon forming respectively a central working portion, an enlarged portion at one side thereof and an annular bearing-shoulder, and a wear-compensating disk interposed between the sleeves forming the enlarged portion and the annular shoulder.

4. In apparatus for forming recessed pipe-couplings and the like, the combination of a roll provided with a working face and flanges at the sides thereof and having an annular bearing-shoulder formed on one of said flanges, and a mandrel coöperating with said roll and comprising an arbor, and sleeve portions thereon forming respectively a central working face, an enlarged portion at one side thereof and an annular bearing-shoulder arranged to coöperate with the bearing-shoulder of the roll, and a wear-compensating disk interposed between the sleeves forming the enlarged portion and the annular bearing-shoulder.

5. A mandrel for use in welding recessed pipe-couplings and the like, consisting of two transversely-separable sections, one comprising a central portion corresponding in diameter and shape to the interior of the coupling, a portion of enlarged diameter at one side of said central portion, said central and enlarged portions being formed as separate parts, means for securing said parts together, and means for advancing said enlarged portion toward said central portion to compensate for wear.

6. A mandrel for use in welding recessed pipe-couplings and the like, consisting of two transversely-separable sections, one section comprising an enlarged end portion and the other section comprising a central sleeve corresponding in diameter and shape to the interior of the coupling, an end sleeve of enlarged diameter, an arbor on which said sleeves are mounted, a shoulder on said arbor, and a wear-compensating disk placed between said shoulder and said enlarged sleeve whereby to advance the latter toward the central sleeve to compensate for wear.

7. In apparatus for forming recessed pipe-couplings and the like, the combination of a roll provided with a working face and flanges on the sides thereof and having an annular bearing-shoulder formed on one of said flanges, and a mandrel comprising two transversely-separable sections, one of said sections forming an enlarged end portion projecting into the pass of the rolls and the other consisting of an arbor and three sleeves or collars thereon, one forming the central portion of the mandrel, another forming an enlarged end portion projecting into the pass of the rolls, and the third forming an annular shoulder to coöperate with the annular shoulder of the roll, and a disk interposed between the last two sleeves to compensate for wear.

8. A mandrel for use in welding recessed pipe-couplings and the like, consisting of two transversely-separable sections, one comprising the main body portion and an enlargement at one end thereof, and the other being an enlarged end portion, a stationary shaft on which the latter is rotatably mounted, and means for adjusting said end portion longitudinally on said shaft to compensate for wear.

9. A mandrel for use in welding recessed pipe-couplings and the like, consisting of two transversely-separable sections, one comprising the main body and an enlarged end portion and the other comprising an enlarged end portion formed as a sleeve provided with an enlarged bore, a stationary shaft provided with a head fitting in the bore of said sleeve, and an adjusting-nut on said shaft and holding said sleeve toward said head.

10. A mandrel for use in welding recessed pipe-couplings and the like, consisting of two transversely-separable sections one of said sections comprising the main body and an enlarged end portion, and the other comprising an enlarged end portion, a shaft on which said latter section is rotatably mounted, and means for adjusting said shaft longitudinally to compensate for wear.

11. A mandrel for use in welding recessed pipe-couplings and the like, consisting of two transversely-separable sections, one comprising an enlarged end portion provided with a socket, a stationary shaft on which the same is mounted, means for moving the same longitudinally to compensate for wear, and the other portion comprising an arbor provided with a shoulder, a sleeve thereon forming the central portion of the mandrel, another sleeve thereon forming an enlarged end portion, a wear-compensating disk between said last sleeve and a shoulder on the mandrel, and a nut on the end of the arbor securing said sleeves in position and adapted to enter the recess in the other mandrel-section.

12. A mandrel for use in welding recessed pipe-couplings and the like, consisting of two transversely-separable sections one comprising a central portion and an enlarged portion at one side thereof, said central and enlarged portions being formed as separate sleeves, an arbor on which the same are mounted, a shoulder on said arbor, a wear-compensating disk between said shoulder and the sleeve forming the enlarged end portion, and the other mandrel-section comprising an enlarged end portion, a stationary shaft on which the same is rotatably mounted, and a nut for adjusting the same longitudinally on said shaft.

JOHN A. HOCK.
HENRY W. HOCK.

Witnesses:
W. L. KAUFFMAN,
W. D. VAN HORN.